United States Patent [19]

Tillman

[11] Patent Number: 4,681,135

[45] Date of Patent: Jul. 21, 1987

[54] TIME-DELAY VALVE

[75] Inventor: Alfred J. Tillman, Temple Terrace, Fla.

[73] Assignee: Moog, Inc., East Aurora, N.Y.

[21] Appl. No.: 854,403

[22] Filed: Apr. 18, 1986

[51] Int. Cl.[4] .............................................. G05D 16/00

[52] U.S. Cl. .............................. 137/489.5; 137/492.5; 251/57; 251/54

[58] Field of Search .................. 137/489, 489.5, 492.5, 137/492, 624.11; 251/54, 57, 63.4

[56] References Cited

U.S. PATENT DOCUMENTS

| | | | |
|---|---|---|---|
| 2,663,153 | 12/1953 | Grant | 251/63.4 X |
| 3,145,736 | 8/1964 | Gheen | 251/50 X |
| 3,326,237 | 6/1967 | Frick | 137/489.5 X |
| 3,406,682 | 10/1968 | Engstrom | 251/54 X |

FOREIGN PATENT DOCUMENTS

| | | | |
|---|---|---|---|
| 125709 | 8/1949 | Sweden | 137/489.5 |

*Primary Examiner*—Alan Cohan

*Attorney, Agent, or Firm*—Sommer & Sommer

[57] ABSTRACT

A time-delay valve is adapted to be used in association with a source of pressurized first fluid, such as $CO_2$. When $CO_2$ is admitted to the inlet of the time-delay valve, an entrapped liquid is pressurized to a known level. Such pressurized liquid is constrained to flow through a restricted orifice, to enter an expanding chamber having a movable piston. The piston is thereafter displaced from a first position to a second position, between which the $CO_2$ is not permitted to pass from the inlet to the outlet. However, after the piston passes beyond the second position, pilot and main valve elements are moved off their respective seats, and first fluid is permitted to flow directly from the inlet to the outlet.

17 Claims, 5 Drawing Figures

TIME-DELAY VALVE

BACKGROUND OF THE INVENTION

1. Field of the Invention

The present invention relates generally to the field of time-delay valves, and, more particularly, to an improved time-delay valve which is particularly suitable for use in connection with fire-fighting apparatus.

2. Description of the Prior Art

Often, a structure is subdivided into a plurality of discrete sections which may be selectively isolated from one another, and there are a myriad of different reasons for this construction.

For example, a building might be so subdivided to isolate a potentially hazardous environment. Such hazardous environment might contain combustible fluids.

Ships are another example of such structures. It is common to subdivide a ship into a plurality of compartments which may be selectively sealed from one another in the case of flooding or fire. Present ship designs often incorporate a system to flood a compartment with a suitable gas, such as $CO_2$, to smother and suppress the fire before it spreads to other parts of the vessel.

Such fire-fighting systems generally have a suitable activation device, which may be operated as soon as a fire is observed. However, it is necessary to provide an appropriate time delay following activation, to permit personnel to evacuate the affected compartment and to permit the compartment to be sealed off. At the same time, any such time-delay device must be of reliable construction, and must be able to remain in a stand-by condition for long periods of time. Moreover, such device should be non-electrical so that the reliability of its operation does not depend on the continuity of an electrical circuit, and so that its operation does not generate an igniting spark.

SUMMARY OF THE INVENTION

With parenthetical reference to the corresponding structure of the presently-preferred embodiment for illustrative purposes only, this invention provides an improved time-delay valve (e.g., 10) which is adapted to be associated with a source of pressurized first fluid (e.g., a liquid or a gas), such as $CO_2$ or the like.

The improved valve broadly comprises: a body (e.g., 11) having an inlet (e.g., 151), an outlet (e.g., 152), a first passageway (e.g., including 154,150,149,155) communicating the inlet and outlet, a first seat (e.g., defined by the intersection of surfaces 84,85) surrounding a portion of the first passageway, a middle or first chamber (e.g., 13), and a connecting passageway (e.g., 15) communicating with the first chamber, the first chamber having a first wall portion (e.g., middle piston 164) movable relative to the body so as to vary the volume of the first chamber, the first wall portion being biased (e.g., by spring 188) toward a position (e.g., as shown in FIG. 1) at which the volume of the first chamber will be at a minimum, the inlet being adapted to selectively receive first fluid from the source; a second fluid (e.g., water-ethylene glycol) occupying the first chamber and the connecting passageway; a restricted orifice (e.g., 16) arranged in the connecting passageway so as to impede a flow of second fluid into the first chamber; pressurizing means (e.g., left piston 164, and pressurizing piston 190) for causing second fluid to flow through the restricted orifice and enter the first chamber when first fluid is admitted to the inlet; a first valve element (e.g., 18) mounted for movement toward and away from the first seat, the first valve element being biased (e.g., by spring 107) to move toward the seat to normally close the first passageway (e.g., as shown in FIG. 2); and a member (e.g., bolt 176) mounted for movement with the first wall portion, and arranged to selectively engage the first valve element, the member being movable from a first position (e.g., as shown in FIGS. 1 and 4) to a second position (e.g., as shown in FIG. 5) between which the member will not displace the first valve element off its seat, and being further movable beyond the second position (e.g., as shown in FIG. 3) after which the member will displace the first valve element off its seat; whereby, first fluid will not flow through the first passageway until the member has moved beyond the second position and has displaced the first valve element off its seat.

Accordingly, the general object of the invention is to provide an improved time-delay valve.

Another object is to provide an improved time-delay valve which does not require electrical parts or components.

Still another object is to provide an improved time-delay valve which may be used in conjunction with fire-fighting apparatus.

These and other objects and advantages will become apparent from the foregoing and ongoing written specification, the drawings, and the appended claims.

DESCRIPTION OF THE PREFERRED EMBODIMENTS

Figure 1:
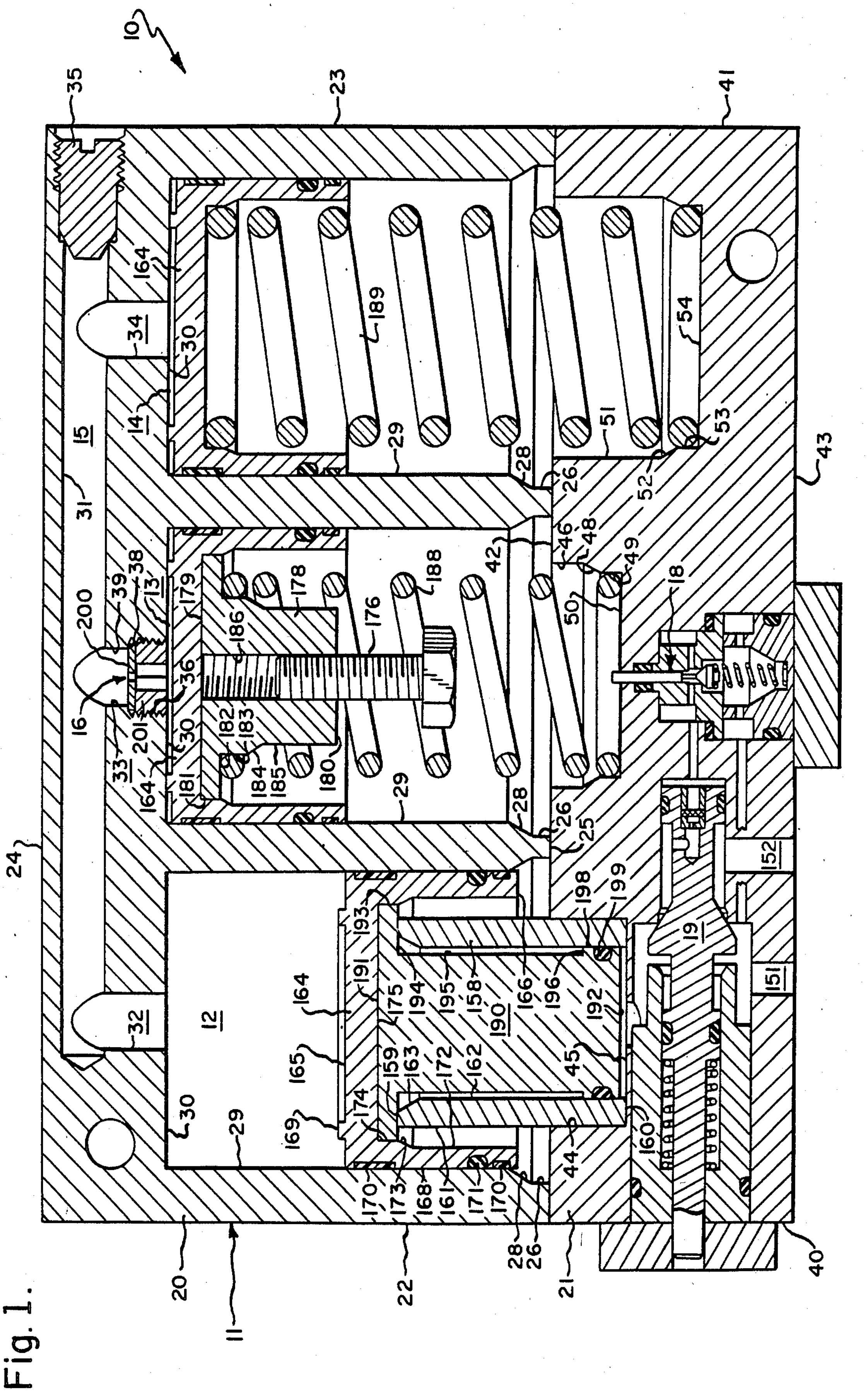
FIG. 1 is a fragmentary vertical sectional view of the presently-preferred embodiment of the improved time-delay valve, this view showing the apparatus in a stand-by condition before fluid is admitted to the inlet.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, proportion, degree, arrangement of parts, etc.) together with the specification and are to be considered a portion of the entire "written description" of this invention, as required by 35 U.S.C. §112. Moreover, the drawings should generally be regarded as being to scale, unless otherwise indicated. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation or axis of rotation, as appropriate.

STRUCTURE

Referring now to the drawings, and more particularly to FIG. 1 thereof, this invention provides an improved time-delay valve, of which the presently-preferred embodiment is generally indicated at 10, which is adapted to selectively communicate with a suitable source (not shown) of first fluid. If the improved time-delay valve is used in connection with fire-fighting apparatus, such first fluid (i.e., a liquid or a gas) might be carbon dioxide ($CO_2$) or the like. However, it should be clearly understood that the improved time-delay valve is not limited to fire-fighting applications, or for use with $CO_2$. Hence, this application and particular type of serviced fluid are for illustrative purposes only, and should not be viewed as limiting the scope of the appended claims.

The improved time-delay valve 10 is shown as broadly including an assembled body, generally indicated at 11. The body has three chambers 12,13,14, respectively, therewithin; a connecting passageway, generally indicated at 15, communicating these three chambers with one another; a restricted orifice, generally indicated at 16, arranged in the connecting passageway so as to impede a flow of fluid into the first chamber 13; and first and second valve elements 18,19 respectively.

Body 11 is shown as being of sectional construction, and includes an upper part 20 and a lower part 21. The body upper part 20 is shown as being a horizontally-elongated rectangular member having rectangular vertical left and right side faces 22,23, respectively, and rectangular horizontal upper and lower faces 24,25, respectively. The body upper part is shown as being provided with three horizontally-spaced vertically-elongated cylindrical recesses, each of which extends upwardly into the body upper part 22 from its lower face 25. Each of these recesses is shown as being sequentially bounded by (from bottom to top in FIG. 1): an inwardly-facing vertical cylindrical surface 26 extending upwardly from lower face 25, an inwardly- and downwardly-facing frusto-conical surface 28, an inwardly-facing vertical cylindrical surface 29 extending upwardly therefrom, and an uppermost downwardly-facing annular horizontal surface 30.

In the preferred embodiment, the connecting passageway 15 communicates each of these three body recesses. Specifically, the connecting passageway is shown as including a horizontal blind hole 31 drilled leftwardly into the body upper part from its right face 23, and three intersecting vertical holes 32,33,34 extending axially upwardly from the associated body recesses to intersect horizontal hole 31. The right end of connecting passageway hole 31 is shown as being closed by a suitable plug 35 threaded into engagement with the body. The intersecting hole of the middle recess is shown as specifically being bounded by: an internally-threaded portion 36 extending upwardly from middle recess bottom surface 30, a downwardly-facing annular horizontal surface 38, and an inwardly-facing vertical cylindrical surface 39 continuing axially upwardly therefrom to intersect horizontal hole 31.

The body lower part 21 is also shown as being a horizontally-elongated rectangular member having rectangular vertical left and right faces 40,41, and rectangular horizontal upper and lower faces 42,43, respectively. Three vertical recesses extend downwardly into the body lower part from its upper surface 42. These three recesses are adapted to be axially aligned with the corresponding recesses in the body upper part when the body is assembled. The leftwardmost recess is shown as being bounded by: an inwardly-facing vertical cylindrical surface 44 extending downwardly from upper face 42, and an upwardly-facing annular horizontal surface 45. The middle recess is sequentially bounded by: an inwardly-facing vertical cylindrical surface 46 extending downwardly from upper face 42, an inwardly- and upwardly-facing frusto-conical surface 48, an inwardly-facing vertical surface 49 continuing downwardly therefrom, and an upwardly-facing annular horizontal surface 50. The rightwardmost recess is shown as being sequentially bounded by: an inwardly-facing vertical cylindrical surface 51 extending downwardly from upper face 42, an inwardly- and upwardly-facing frusto-conical surface 52, an inwardly-facing vertical cylindrical surface 53 continuing downwardly therefrom, and an upwardly-facing horizontal circular surface 54.

Figure 2:
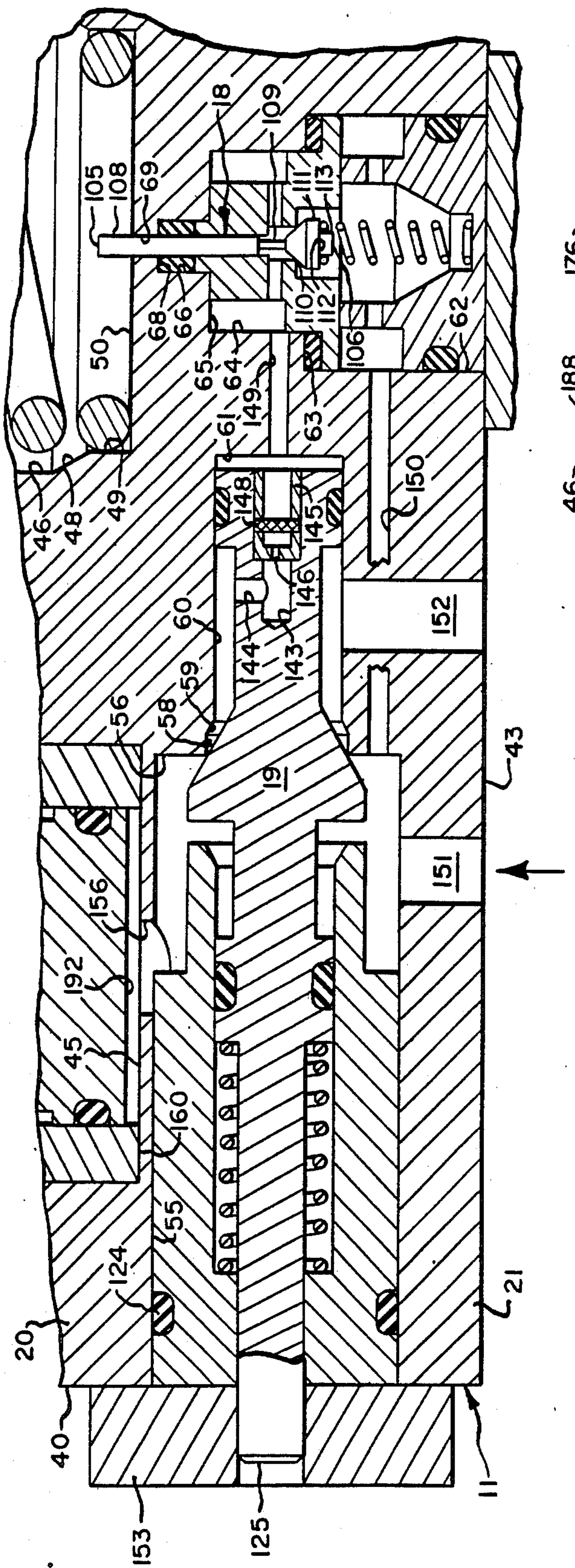
FIG. 2 is an enlarged detail view thereof, showing the first and second valve elements as sealingly engaging their respective seats to prevent flow from the inlet to the outlet.

Referring now to FIGS. 1 and 2, a stepped passage is shown as extending rightwardly into the body lower part from its left face 40. As best shown in FIG. 2, this passage has a horizontal axis and is sequentially bounded by: an inwardly-facing horizontal cylindrical surface 55 extending rightwardly from left face 40, a leftwardly-facing annular vertical surface 56, an inwardly-facing horizontal cylindrical surface 58, an inwardly- and leftwardly-facing frusto-conical surface 59, an inwardly-facing horizontal cylindrical surface 60, and a leftwardly-facing annular vertical surface 61.

Another stepped recess extends upwardly into the body lower part from its lower face 43. As best shown in FIG. 2, this recess has a vertical axis aligned with the axis of the upper part middle recess and is sequentially bounded by: an inwardly-facing vertical cylindrical surface 62 extending upwardly from lower face 43, a downwardly-facing annular horizontal surface 63, an inwardly-facing vertical cylindrical surface 64, a downwardly-facing annular horizontal surface 65, an inwardly-facing vertical cylindrical surface 66, a downwardly-facing annular horizontal surface 68, and an inwardly-facing vertical cylindrical surface 69 continuing upwardly therefrom to join middle recess surface 50.

Figure 3:
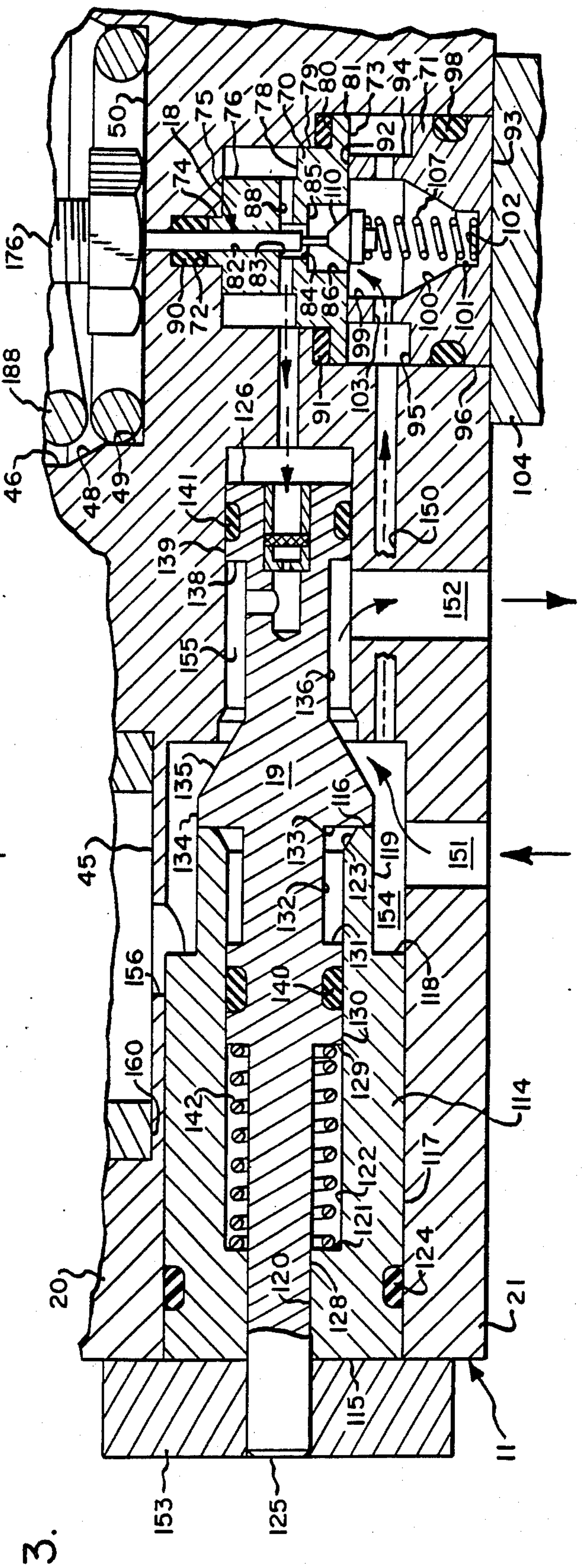
FIG. 3 is a view similar to FIG. 2, but showing the first and second valve elements as having been displaced off their respective seats to permit flow from the inlet to the outlet.

Referring now principally to FIGS. 2 and 3, a first poppet valve assembly is arranged in this latter body recess. This first poppet valve assembly is shown as broadly including the first valve element 18, a seat member 70 and a retaining ring 71.

The seat member 70 is shown as being a specially-configured structural element generated about a vertical axis. Specifically, the seat member has an annular horizontal upper face 72, an annular horizontal lower face 73, and a stepped outer surface which sequentially includes (from top to bottom in FIG. 3): an outwardly-facing vertical cylindrical surface 74 extending downwardly from upper face 72, an upwardly-facing annular horizontal surface 75, an outwardly-facing vertical cylindrical surface 76, an upwardly-facing annular horizontal surface 78, an outwardly-facing vertical cylindrical surface 79, an upwardly-facing annular horizontal surface 80, and an outwardly-facing vertical cylindrical surface 81 continuing downwardly therefrom to join lower face 73. The seat member has a stepped axial through-bore which is sequentially bounded by (from top to bottom in FIG. 3): an inwardly-facing vertical cylindrical surface 82 extending downwardly from upper face 72, a downwardly-facing annular horizontal surface 83, an inwardly-facing vertical cylindrical surface 84, a downwardly-facing annular horizontal surface 85, and an inwardly-facing vertical cylindrical surface 86 continuing downwardly therefrom to join lower face 73. A horizontal hole 88 extends diametrically through an intermediate portion of the seat member so as to communicate through-bore surface 84 with outer surface 76. The seat member is arranged in the body recess such that seat member surface 75 abuts body surface 65. In this configuration, an O-ring 90 is compressed between the first valve element and surfaces 66,68,72, and another O-ring 91 is compressed between surfaces 62,63,79,80. The intersection of seat member surfaces 84,85 provides an annular seat for the first valve element.

Retaining ring 71 is also shown as being a specially-configured member also generated about a vertical axis. This ring has an annular horizontal upper face 92, a circular horizontal lower face 93, and an outer surface which sequentially includes (from top to bottom): an outwardly-facing vertical cylindrical surface 94 extending downwardly from upper face 92, an upwardly-facing annular horizontal surface 95, and an outwardly-facing vertical cylindrical surface 96 continuing downwardly therefrom to join lower face 93. An annular recess extends radially into the retaining ring from its outer surface 96 to receive and accommodate an O-ring 98, which seals the joint between facing surfaces 96,62. A blind recess extends axially downwardly into the retaining ring. This recess is sequentially bounded by: an inwardly-facing vertical cylindrical surface 99 extending downwardly from upper face 92, an inwardly- and upwardly-facing frusto-conical surface 100, an inwardly-facing vertical cylindrical surface 101, and an upwardly-facing circular horizontal surface 102. A horizontal hole 103 extends diametrically through the retaining ring so as to communicate surfaces 99,94. The retaining ring 71 is inserted into the body recess such that its upper face 92 will bear against the lower face 73 of the seat member. The retaining ring is held in this position by a cap member 104, which is suitably secured to the body by conventional fasteners (not shown).

The first valve element 18 is shown as being a specially-configured stepped rod-like member also generated about a vertical axis. Valve element 18 has a circular horizontal upper face 105, a circular horizontal lower face 106, and an outer surface which is sequentially bounded by (from top to bottom): an outwardly-facing vertical cylindrical surface 108 extending downwardly from upper face 105, a downwardly-facing annular horizontal surface, an outwardly-facing vertical cylindrical surface 109, an upwardly-facing annular horizontal surface, an outwardly- and upwardly-facing frusto-conical surface 110, an outwardly-facing vertical cylindrical surface 111, a downwardly-facing annular horizontal surface 112, and an outwardly-facing vertical cylindrical surface 113 continuing downwardly therefrom to join lower face 106. The first valve element 18 is arranged such that its outer surface 108 slidably engages body surface 69 and seat member through-bore surface 82, with O-ring 90 sealing the sliding joint therebetween. The frusto-conical surface 110 of the valve element is arranged to move upwardly and downwardly relative to the annular seat formed by the intersection of seat member surfaces 84,85. A compressed coil spring 107 acts between retaining ring recess surface 102 and first valve element surface 112. Spring 107 continuously urges the first valve element to move upwardly until valve element frusto-conical surface 110 engages the annular seat defined by the intersection of surfaces 84,85. However, the first valve element may be selectively moved downwardly off its seat when the opposing spring bias is overcome.

A second poppet valve assembly is operatively arranged in the horizontal body recess. This second poppet assembly includes a retaining member 114, and a second valve element 19.

As best shown in FIGS. 2 and 3, retaining member 114 is a specially-configured tubular member generated about a horizontal axis. Retaining member 114 specifically includes an annular vertical left face 115, an annular vertical right face 116, and an outer surface which sequentially includes (from left to right): an outwardly-facing horizontal cylindrical surface 117 extending rightwardly from left end face 115, a rightwardly-facing annular vertical surface 118, and an outwardly-facing horizontal cylindrical surface 119 continuing rightwardly therefrom to join right end face 116. Retaining member 114 is also shown as being provided with a horizontal axial throughbore, which is sequentially bounded by (from left to right): an inwardly-facing horizontal cylindrical surface 120 extending rightwardly from left end face 115, a rightwardly-facing annular vertical surface 121, an inwardly-facing horizontal cylindrical surface 122, and an inwardly- and rightwardly-facing frusto-conical surface 123 continuing rightwardly therefrom to join right end face 116. An annular groove extends radially into retaining member 114 from its outer surface 117 to receive and accommodate an O-ring 124, which seals the joint between the retaining member and the body.

The second valve element 19 is depicted as being a specially-configured horizontally-elongated stepped rod-like member having a circular vertical left end face 125, and an annular vertical right end face 126. The outer surface of second valve member 19 sequentially includes (from left to right in FIG. 3): an outwardly-facing horizontal cylindrical surface 128 extending rightwardly from left end face 125, a leftwardly-facing annular vertical surface 129, an outwardly-facing horizontal cylindrical surface 130, a rightwardly-facing annular vertical surface 131, an outwardly-facing horizontal cylindrical surface 132, a leftwardly-facing annular vertical surface 133, an outwardly-facing horizontal cylindrical surface 134, an outwardly- and rightwardly-facing frusto-conical surface 135, an outwardly-facing horizontal cylindrical surface 136, a leftwardly-facing annular vertical surface 138, and an outwardly-facing horizontal cylindrical surface 139 continuing rightwardly therefrom to join right end face 126. An annular groove extends into the second valve element from surface 130 to receive and accommodate an O-ring 140, which seals the sliding joint between facing surfaces 130,122. Another annular groove extends into the second valve element from surface 139 to receive and accommodate another O-ring 141, which seals the sliding joint between facing surfaces 60,139. A coil spring 142 is arranged to act between the retaining member and the second valve element. Specifically, spring 142 is compressed and acts between retaining member surface 121 and valve member surface 129, and continuously urges the second valve member to move rightwardly relative to the retaining member until valve element surface 135 engages the annular seat defined by the intersection of body surfaces 56,58, as shown in FIG. 2. However, valve member 19 may be selectively moved leftwardly relative to the retaining member until valve member surface 133 abuts retaining member right end face 116, as shown in FIG. 3.

An L-shaped passageway is provided in the right marginal end portion of the second valve element. This passageway includes a horizontal axial blind hole 143 drilled leftwardly into the second valve element from its right end face 126, and an intersecting radial hole 144 which extends outwardly therefrom to open onto valve element surface 136. A cup-shaped member 145 provided with a restricted orifice 146 is positioned in the right marginal end portion of hole 143. This cup-shaped member 145 also is shown as further including a filter screen 148 positioned upstream of the orifice, so as to prevent contaminants from blocking or otherwise occluding the orifice.

A horizontal hole 149 communicates body recess surfaces 61,64. Another horizontal hole 150 communicates body recess surfaces 56,62. The body is further shown as including a vertical inlet opening 151 which communicates body surfaces 43, 55, and a vertical outlet opening 152 which communicates body surfaces 60,43. An annular end cap, generally indicated at 153 is removably mounted on the body, as by conventional fasteners (not shown), and prevents unintended separation of the retaining member therefrom.

A main passageway is arranged to selectively communicate the inlet 151 with the outlet 152. This first passageway includes an annular first chamber 154 which continuously communicates with the inlet, and also includes another rightward chamber 155 which continuously communicates with the outlet 152. These two chambers are arranged to be selectively isolated from one another when the second valve element engages its seat. Thus, when spring 142 expands to urge the second valve element surface 135 to move rightwardly against its seat (as shown in FIG. 2), the first and second chambers 154,155 of the first passageway are interrupted and isolated from one another. However, when the second valve element is moved leftwardly off its seat (as shown in FIG. 3), chambers 154,155 communicate with one another and permit fluid to flow from the inlet to the outlet. A vertical hole 156 extends between surfaces 55, 45 so that chamber 154 will communicate with the body lower part left recess.

Adverting now to FIG. 1, a thin-walled tubular sleeve member 158 is shown as being arranged in the body lower part left recess. Specifically, sleeve member 158 is shown as having an annular horizontal upper face 159; an annular horizontal lower face 160; an outwardly-facing vertical cylindrical surface 161; and an inner surface which sequentially includes an inwardly-facing vertical cylindrical surface 162 extending upwardly from lower face 160, and an inwardly- and upwardly-facing frusto-conical surface 163 continuing upwardly therefrom to join upper face 159. The lower marginal end portion of sleeve member 158 is positioned in the left lower body recess such that sleeve lower end face 160 abuts recess bottom surface 45. This sleeve member 153 may be regarded as a part of the body.

Still referring principally to FIG. 1, a piston is arranged in each of the three upper body recesses. These pistons are structurally identical, and are severally indicated at 164. Each piston is shown as being an inverted cup-shaped member having a horizontal circular upper face 165, an annular horizontal lower face 166, and an outwardly-facing cylindrical side wall surface 168. An annular ring or lug 169 extends axially upwardly beyond and above piston upper face 165 to prevent possible occlusion of the associated passageway opening 32,33,34 when the piston moves upwardly to the end of its stroke. A pair of vertically-spaced annular grooves extend radially into the piston from its outer surface 168 to receive and accommodate a corresponding number of low-friction bearings, severally indicated at 170. Another intermediate annular groove extends radially into the piston from surface 168 to receive and accommodate an O-ring 171, which seals the sliding joint between the piston outer surface 168 and the inwardly-facing surface 29 of the associated upper body recess. Each piston has an inner surface which sequentially includes (from bottom to top in FIG. 1): an inwardly-facing vertical cylindrical surface 172 extending upwardly from lower face 166, an inwardly- and downwardly-facing frusto-conical surface 173, an inwardly-facing vertical cylindrical surface 174 continuing upwardly therefrom, and a downwardly-facing circular horizontal surface 175.

Referring now to the middle or first chamber 13, a bolt 176 and bolt-carrying member 178 are operatively arranged to engage the underside of the middle piston. The bolt-carrying member 178 has annular horizontal upper and lower faces 179,180, respectively, and an outer surface which sequentially includes: an outwardly-facing vertical cylindrical surface 181 extending downwardly from upper face 179, a downwardly-facing annular horizontal surface 182, an outwardly-facing vertical cylindrical surface 183, a downwardly- and outwardly-facing frusto-conical surface 184, and an outwardly-facing vertical cylindrical surface 185 continuing downwardly therefrom to join lower end face 180. Moreover, the bolt-carrying member is provided with an internally-threaded axial vertical through-bore 186. Bolt 176, which may be of conventional design, has its threaded shank portion matingly received in the threaded bore 186 of the bolt-carrier. Hence, the position of the lowermost head of the bolt relative to the bolt-carrier. Hence, the position of the lowermost head of the bolt relative to the bolt-carrier may be selectively adjusted by means of the threaded connection therebetween.

A coil spring 188 is arranged to act between the body and bolt-carrier. Specifically, the lower marginal end portion of spring 188 is arranged to bear against body surface 50, while the upper end thereof is arranged to bear against bolt-carrier surface 182. Spring 188 is compressed, and continuously urges the bolt-carrier to move upwardly relative to the body, so as to bias the middle piston to an uppermost or first position (shown in FIGS. 1 and 4) at which the volume of the first chamber 13 will be at a minimum. In this first position, the upper surface of lug 169 abuts body recess surface 30.

A coil spring 189 is operatively arranged in the body right recess to act between the body and the right piston. Specifically, the lower marginal end portion of spring 189 is arranged to bear against body right recess surface 54, while the upper marginal end portion thereof is arranged to bear directly against right piston surface 175. Spring 189 is compressed, and continuously urges the right piston to move upwardly to the position shown in FIG. 1, at which the volume of the second chamber 14 will be at a minimum.

A pressurizing piston 190, having a somewhat T-shaped cross-section, is shown as being operatively arranged within the tubular sleeve member 158, and as engaging the leftward piston. This pressurizing piston is shown as having a horizontal circular upper face 191 engaging piston surface 175; a circular horizontal lower face 192; and an outer surface which sequentially includes: an outwardly-facing vertical cylindrical surface 193 extending downwardly from upper face 191, a downwardly-facing annular horizontal surface 194, an outwardly-facing vertical cylindrical surface 195, an upwardly-facing annular horizontal surface 196, and an outwardly-facing vertical cylindrical surface 198 continuing downwardly therefrom to join lower end face 192. An annular groove extends radially into the pressurizing piston from surface 198 to receive and accommodate an O-ring 199, which seals the sliding joint between facing surfaces 162, 198.

The restricted orifice 16 is shown as being provided in a portion of the connecting passageway immediately above the first chamber 13. Specifically, a washer-like orifice plate 200 arranged so as to have its horizontal annular upper surface engage body surface 38, and a suitable retaining ring 201 threaded into engagement with body threaded portion 36 so as to retain the orifice plate in the position shown in FIG. 1. This orifice plate is shown as having a central vertical opening therethrough, which is of substantially reduced diameter relative to the diameter of the connecting passageway, and therefore constitutes a substantial impediment to flow of fluid from the connecting passageway into first chamber 13.

The first, second and third chambers 12,13,14, as well as the connecting passageway 15, are preferably entirely filled with a suitable second fluid. This fluid is preferably a liquid, such as a water-ethylene glycol mixture. Thus, while the volume of such entrapped fluid is constant, the volumes of the three chambers may vary in a reciprocal manner such that the volume of one chamber will increase as the volume of the other chamber(s) decreases.

OPERATION

The improved time-delay valve 10 is adapted to be associated with a source (not shown) of pressurized first fluid. In fire-fighting applications, this first fluid may be $CO_2$ gas or the like. However, this particular application is only exemplary, and should not be regarded as limitative of the scope of the appended claims.

In any event, the improved time-delay valve is normally isolated from the first fluid, which may, for example, be stored in a hermetically-sealed cylinder (not shown). Thus, until a suitable means, such as a valve or the like, is operated to admit the first fluid to the inlet 151 of the improved time-delay valve, the various parts and components of the time-delay valve will be in the condition shown in FIG. 1. Specifically, the first and second valve elements 18,19 will engage their respective seats. Springs 188,189 will hold their associated pistons so that the volumes of the middle and right chambers 13,14 will be a minimum. Since the connecting passageway 15 is filled with a relatively incompressible liquid, the upward position of the middle and right pistons will cause the leftward piston 164 to be in the position shown in FIG. 1, such that the volume of left chamber 12 will be at its maximum. The downstream sides of the first and second valve elements will be at the pressure of the outlet 152.

Figure 4:
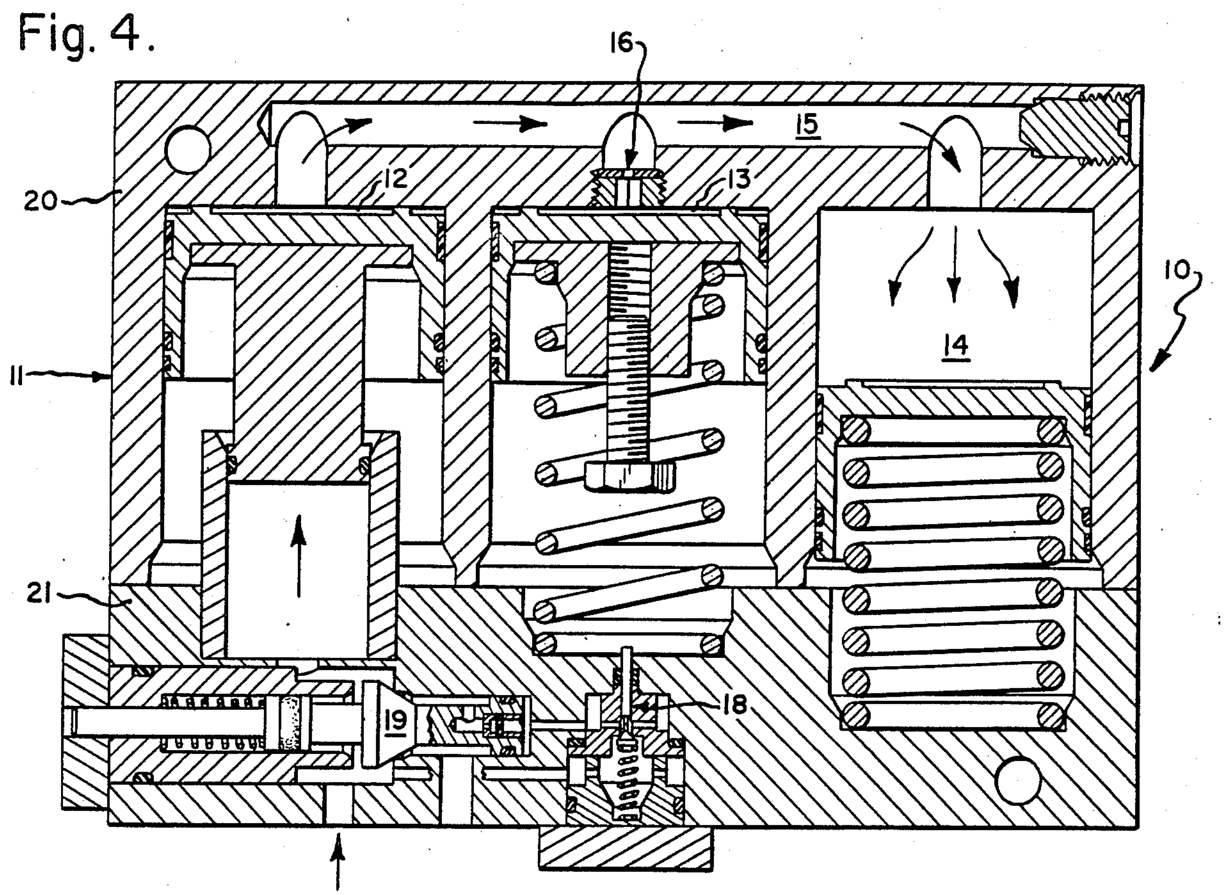
FIG. 4 is a reduced-scale vertical sectional view of the apparatus, generally similar to FIG. 1, but showing the positions of the first, second and third pistons relative to the body shortly after first fluid has been admitted to the inlet, this view showing the first piston as being in its uppermost first position.

Assume now that an operator activates a suitable mechanism to admit highly-pressurized $CO_2$ gas to the inlet 151. The first chamber 154 will therefore be immediately pressurized to that of the first fluid supplied to the inlet. Such pressure will act on the lower face 192 of the pressurizing piston. Thus, the inlet pressure, acting across the circular cross-sectional area of pressurizing piston lower face 192, will exert an upward force on the pressurizing piston, which drives the piston upwardly to abut left recess surface 30. Since the fluid in the communicating passageway is incompressible, and since such fluid may not readily pass through restricted orifice 16, such upward movement of the pressurizing piston will displace second fluid from left chamber 12 to right chamber 14, driving right piston 164 downwardly, as shown in FIG. 4. Thus, the pressure of the second fluid, acting across the area of the upper face 165 of the right piston, creates a downward force on the right piston, which force is ultimately opposed by the compressive displacement of coil spring 189. Hence, when the apparatus is in the condition shown in FIG. 4, the upward force exerted by further-compressed spring 189 on the right piston pressurizes the second fluid in the connecting passageway. At the same time, since the left piston 164 has bottomed on recess surface 30, the pressure at the inlet 151 no longer affects the pressure of the second fluid.

Figure 5:
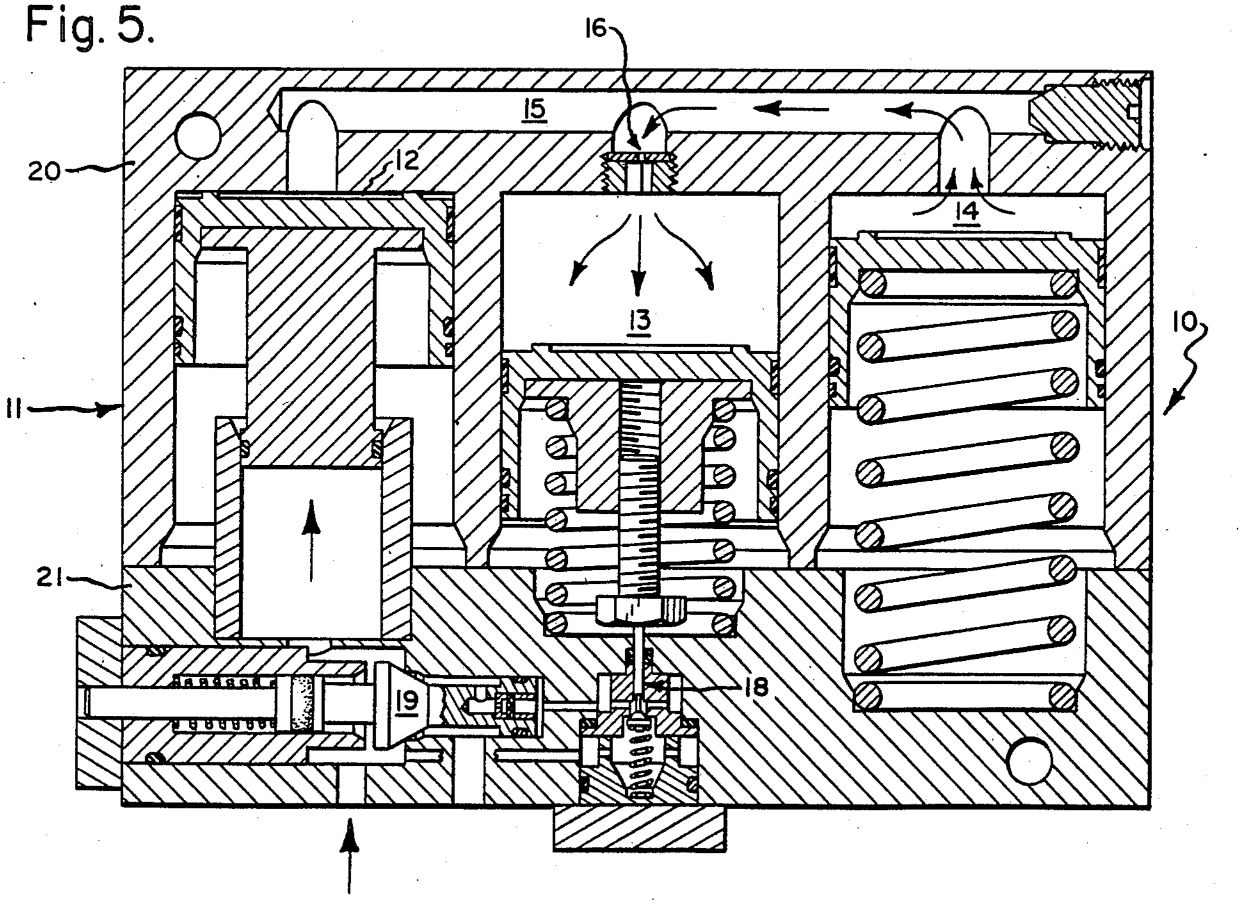
FIG. 5 is a view generally similar to FIG. 4, but showing the first piston and bolt member as having moved downwardly from its first position to its second position, at which the bolt member just contacts the first valve element, this view showing the first and second valve elements as continuing to engage their respective seats such that further downward movement of the bolt member relative to the body will displace the first valve element off its seat and permit flow from the inlet to the outlet.

Spring 189 now begins to expand as second fluid passes through the restricted orifice 16 to enter the middle or first chamber 13. The pressure of such second fluid, acting across the upper face 165 of the middle piston 164, creates a downward force which exceeds the upward force exerted on the middle piston by spring 188. Hence, the middle piston begins to move downwardly at a rate proportional to the flow through the restricted orifice from the first position shown in FIG. 4 to the second position shown in FIG. 5. At this second position, the head of bolt 176 just contacts the upper face of the first valve element, but does not displace the first valve element off its seat.

As spring 189 continues to expand, the middle piston continues to move downwardly beyond this second position, and bolt 176 displaces the first valve element 18 off its seat, thereby opening a pilot passageway between the inlet and the outlet. Specifically, this pilot passageway includes inlet 151, chamber 154, hole 150, the annular chamber within and without the retaining member 71, hole 149, restricted orifice 146, holes 143,144, and chamber 155 which communicates with outlet 152. Since restricted orifice 146 constitutes a substantial impediment to flow, the inlet pressure in the pilot passageway acts across the right end face 126 of the second valve element. This creates a force greater than the opposing force exerted by spring 142, and drives the second valve element 19 leftwardly to the displaced position shown in FIG. 3, thereby opening a main passageway (i.e., now-communicating chambers 154,155). When this happens, fluid may flow from the inlet through chambers 154,155 directly to the outlet 152.

Therefore, the time-delay feature is afforded by selectively pressurizing the second fluid when pressurized first fluid is admitted to the inlet, and by causing such pressurized second fluid to pass through restricted orifice 16. The time needed for such pressurized second fluid to pass through restricted orifice 16, and displace first or middle piston 164 downwardly from the first position (i.e., shown in FIG. 4) to the second position (i.e., shown in FIG. 5) provides the necessary time delay. Thereafter, when the middle piston is displaced further downwardly beyond the second position to displace the first valve element 18 off its seat, first fluid may flow through the pilot passageway to act on the right end face of second valve element 19, displacing it leftwardly off its seat and establishing direct communication between the inlet and the outlet through the now-opened main passageway. So long as the pressure of the first fluid admitted to the inlet 151 is of a magnitude sufficient to move the pressurizing piston upwardly from the position shown in FIG. 1 to the position shown in FIG. 4, the time needed for the second fluid to pass through restricted orifice 16 and displace the first valve element 18 of its seat, will be substantially independent of the magnitude of the inlet pressure.

MODIFICATIONS

The present invention contemplates that many changes and modifications may be made. For example, the body may be formed either integrally or sectionally, as desired. The movable wall portion of any of the chambers may be in the form of a piston, as shown, or may be in the form of a flexible bellows or diaphragm, or some other structure as desired. If desired, the rightward piston and chamber may be omitted entirely, however, in this instance, the pressure of the second fluid, and hence its rate of flow through the restricted orifice, will be dependent upon the pressure of the first fluid admitted to the inlet.

It should also be noted, that the second valve element may be omitted, such that the inlet and outlet will communicate with one another through the pilot passageway only. However, it is presently preferred to provide a pilot passageway for selectively displacing the main valve element 19 off its seat, to selectively communicate the inlet and the outlet through the larger-diameter main passageway. The restricted orifice 146 in the second valve element 19 is only to permit the downstream side of the first valve element to equalize with the outlet pressure. If desired, this restricted orifice 146 may be eliminated altogether. The various plugs, passageways, pistons, bearings and seals, as well as the shape and configuration of the first and second valve elements, may all be readily changed, as desired.

Therefore, while a presently-preferred embodiment of the invention has been shown and described, and certain changes and modifications thereof discussed, persons skilled in this art will readily appreciate that various additional changes and modifications may be made without departing from the spirit of the invention, as defined and differentiated by the following claims.

What is claimed is:

1. A time-delay valve adapted to be associated with a source of pressurized first fluid, comprising:

a body having an inlet, an outlet, a first passageway communicating said inlet and outlet, said first passageway including a main passageway portion communicating said inlet with said outlet and including a pilot passageway portion communicating said inlet with said main passageway portion, a first seat surrounding said pilot passageway portion, a first chamber, and a connecting passageway communicating with said first chamber, said first chamber having a first wall portion movable relative to said body so as to vary the volume of said first chamber, said first wall portion being biased toward a position at which the volume of said first chamber will be at a minimum, said inlet being adapted to selectively receive first fluid from said source;

a second fluid occupying said first chamber and said connecting passageway;

a restricted orifice arranged in said connecting passageway so as to impede a flow of second fluid into said first chamber;

pressurizing means for causing second fluid to flow through said restricted orifice and enter said first chamber when said first fluid is admitted to said inlet;

a first valve element mounted for movement toward and away from said first seat, said first valve element being biased to move toward said seat to normally close said pilot passageway portion;

a second seat surrounding said main passageway portion; and a second valve element mounted in said main passageway for movement toward and away from said second seat, said second valve element being biased to move toward said second seat to normally close said main passageway portion; and a member mounted for movement with said first wall portion, and arranged to selectively engage said first valve element, said member being movable from a first position to a second position between which said member will not displace said first valve element off said first seat, and being further movable beyond said second position after which said member will displace said first valve element off said first seat;

whereby, said first fluid will not flow through said first passageway until said member has moved beyond said second position and has displaced said first valve element off said first seat.

2. A time-delay valve as set forth in claim 1 wherein said second fluid is a liquid.

3. A time-delay valve as set forth in claim 1 wherein said restricted orifice is provided in an orifice plate.

4. A time-delay valve as set forth in claim 1 wherein said first chamber has a first cylindrical wall, and wherein said first wall portion is a piston slidably mounted on said first cylindrical wall.

5. A time-delay valve as set forth in claim 1 wherein said second valve element has a surface, and wherein the pressure at said inlet will act against said surface when said first valve element is displaced off said first seat.

6. A time-delay valve as set forth in claim 5 wherein said surface is an end face of said second valve element.

7. A time-delay valve as set forth in claim 5, and further comprising:

a second passageway communicating said surface with said outlet.

8. A time-delay valve as set forth in claim 7 wherein said second passageway includes a second restricted orifice.

9. A time-delay valve as set forth in claim 7 wherein said second passageway is provided in said second valve element.

10. A time-delay valve as set forth in claim 1 wherein said pressurizing means includes a second chamber communicating with said connecting passageway, wherein said second chamber has a second wall portion movable so as to vary the volume of said second chamber, and wherein said second fluid also occupies said second chamber.

11. A time-delay valve as set forth in claim 10 wherein said second chamber is provided in said body.

12. A time-delay valve as set forth in claim 10 wherein said second wall portion has one surface arranged to face into said second chamber and has an opposite surface exposed to the pressure at said inlet.

13. A time-delay valve as set forth in claim 12 wherein said second wall portion other surface is continuously exposed to the pressure at said inlet.

14. A time-delay valve as set forth in claim 12 wherein said second chamber has a second cylindrical wall, and wherein said second wall portion is a piston slidably mounted on said second cylindrical wall.

15. A time-delay valve adapted to be associated with a source of pressurized first fluid, comprising:

a body having an inlet, an outlet, a passageway communicating said inlet and outlet, a seat surrounding said passageway, a first chamber, a second chamber, a third chamber, and a connecting passageway communicating each of said chambers, said first chamber having a first wall portion movable relative to said body so as to vary the volume of said first chamber, said first wall portion being biased toward a position at which the volume of said first chamber will be at a minimum, said inlet being adapted to selectively receive first fluid from said source;

a second fluid occupying said chambers and said connecting passageway;

a restricted orifice arranged in said connecting passageway so as to impede a flow of second fluid into said first chamber;

pressurizing means for causing second fluid to flow through said restricted orifice and enter said first chamber when said first fluid is admitted to said inlet, said pressurizing means including a second wall portion movable relative to said body so as to vary the volume of said second chamber and including a third wall portion movable relative to said body so as to vary the volume of said third chamber;

a valve element mounted for movement toward and away from said seat, said valve element being biased to move toward said seat to normally close said passageway; and a member mounted for movement with said first wall portion, and arranged to selectively engage said valve element, said member being movable from a first position to a second position between which said member will not displace said valve element off said seat, and being further movable beyond said second position after which said member will displace said valve element off said seat;

whereby, first fluid will not flow through said passageway until said member has moved beyond said second position and has displaced said valve element off said seat.

16. A time-delay valve as set forth in claim 15 wherein said third wall portion is biased to move toward a position at which the volume of said third chamber will be at a minimum.

17. A time-delay valve as set forth in claim 15 wherein said third chamber includes a third cylindrical wall, and wherein said third wall portion includes a third piston slidably mounted on said third cylindrical wall.

* * * * *